(12) United States Patent
Muneto

(10) Patent No.: US 10,442,080 B2
(45) Date of Patent: Oct. 15, 2019

(54) MONITORING DEVICE OF ROBOT SYSTEM

(71) Applicant: KAWASAKI JUKOGYO KABUSHIKI KAISHA, Kobe-shi, Hyogo (JP)

(72) Inventor: Koji Muneto, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 15/780,677

(22) PCT Filed: Nov. 24, 2016

(86) PCT No.: PCT/JP2016/004952
§ 371 (c)(1),
(2) Date: Jun. 1, 2018

(87) PCT Pub. No.: WO2017/094240
PCT Pub. Date: Jun. 8, 2017

(65) Prior Publication Data
US 2018/0361578 A1    Dec. 20, 2018

(30) Foreign Application Priority Data

Dec. 1, 2015  (JP) .................................. 2015-234488

(51) Int. Cl.
*G06F 19/00* (2018.01)
*B25J 9/16* (2006.01)
*B25J 19/06* (2006.01)

(52) U.S. Cl.
CPC .......... *B25J 9/1605* (2013.01); *B25J 9/1676* (2013.01); *B25J 9/1697* (2013.01); *B25J 19/06* (2013.01);
(Continued)

(58) Field of Classification Search
None
See application file for complete search history.

(56) References Cited

U.S. PATENT DOCUMENTS

| 6,778,867 B1 | 8/2004 | Ziegler et al. |
| 2005/0104549 A1 | 5/2005 | Nishimura et al. |

(Continued)

FOREIGN PATENT DOCUMENTS

| JP | H07-223190 A | 8/1995 |
| JP | H07-251394 A | 10/1995 |

(Continued)

*Primary Examiner* — Bhavesh V Amin
(74) *Attorney, Agent, or Firm* — Oliff PLC

(57) ABSTRACT

A monitoring device of a robot system includes: an external force detecting portion configured to detect external force acting on a robot; an area determining portion configured to determine whether or not a predetermined portion of the robot is located within a predetermined area; a force monitoring portion configured to detect collision of the robot based on a first monitoring criterion including at least monitoring of the external force acting on the robot, and when the area determining portion determines that the predetermined portion of the robot is not located within the predetermined area, detect the collision based on a second monitoring criterion not including the monitoring of the external force; and a stop signal generating portion configured to, when the force monitoring portion detects the collision, generate a stop signal of the robot 2 and supply the stop signal to the control device.

6 Claims, 8 Drawing Sheets

(52) U.S. Cl.
CPC ... *B25J 9/1633* (2013.01); *G05B 2219/39325* (2013.01); *G05B 2219/40201* (2013.01); *G05B 2219/40559* (2013.01); *G05B 2219/40587* (2013.01)

(56) References Cited

U.S. PATENT DOCUMENTS

| | | |
|---|---|---|
| 2009/0309531 A1 | 12/2009 | Hamahata |
| 2012/0043831 A1 | 2/2012 | Sakakibara et al. |
| 2013/0338829 A1 | 12/2013 | Schlaich et al. |

FOREIGN PATENT DOCUMENTS

| | | |
|---|---|---|
| JP | H09-305235 A | 11/1997 |
| JP | 2001-525263 A | 12/2001 |
| JP | 2003-236787 A | 8/2003 |
| JP | 2008-022590 A | 1/2008 |
| JP | 2012-040626 A | 3/2012 |
| JP | 2013-545625 A | 12/2013 |
| JP | 2015-526309 A | 9/2015 |
| WO | 2014/036549 A2 | 3/2014 |

MONITORING DEVICE OF ROBOT SYSTEM

TECHNICAL FIELD

The present invention relates to a monitoring device of a robot system.

BACKGROUND ART

Various technologies for monitoring robots have been developed. For example, each of PTLs 1 and 2 discloses a technology in which: a force sensor is provided at a tip end of an arm of a robot; and an abnormality of the robot is monitored based on information detected by the force sensor. Further, each of PTLs 3 and 4 discloses a technology in which: a predetermined area is set in an operating range of a robot; an abnormality of an operating speed of the robot in the predetermined area is monitored.

From the viewpoint of productivity improvement, proposed in recent years is that a robot and an operator work cooperatively in the same work space. Therefore, from the viewpoint of safety, for example, PTL 5 discloses a technology in which: a predetermined area is set in an operating range of a robot; and when it is detected that a person has entered into the predetermined area, the robot is operated at low speed.

CITATION LIST

Patent Literature

PTL 1: Japanese Laid-Open Patent Application Publication No. 07-251394
PTL 2: Japanese Laid-Open Patent Application Publication No. 07-223190
PTL 3: Published Japanese Translation of PCT Application No. 2001-525263
PTL 4: Japanese Laid-Open Patent Application Publication No. 2008-022590
PTL 5: Published Japanese Translation of PCT Application No. 2015-526309

SUMMARY OF INVENTION

Technical Problem

However, according to conventional robot monitoring technologies, a monitoring criterion when detecting collision is the same among all areas, and it cannot be necessarily said that this is optimal for cooperative work performed by a robot and an operator. Therefore, there is a problem that as a technology of monitoring a robot that operates at low speed around a person, a technology suitable for the cooperative work is required.

An object of the present invention is that a monitoring device of a robot system which works while coexisting with a person performs collision detection suitable for cooperative work performed by a robot and an operator.

Solution to Problem

A monitoring device of a robot system according to one aspect of the present invention is a monitoring device of a robot system, the robot system including: a robot including at least one joint shaft and a servo motor configured to drive the joint shaft; and a control device configured to preset a predetermined area in an operating range of the robot and control an operation of the robot, the monitoring device including: an external force detecting portion configured to detect external force acting on the robot; an area determining portion configured to determine whether or not a predetermined portion of the robot is located within the predetermined area; a force monitoring portion configured to when the area determining portion determines that the predetermined portion of the robot is located within the predetermined area, detect collision of the robot based on a first monitoring criterion including at least monitoring of the external force acting on the robot, and when the area determining portion determines that the predetermined portion of the robot is not located within the predetermined area, detect the collision based on a second monitoring criterion not including the monitoring of the external force; and a stop signal generating portion configured to, when the force monitoring portion detects the collision, generate a stop signal of the robot and supply the stop signal to the control device.

According to the above configuration, in the robot system in which, for example, an operator and the robot work while coexisting with each other, the monitoring criterion is different between a low speed operating area (first speed) where a possibility that the robot collides with a person is high and a high speed operating area (second speed) where the possibility that the robot collides with a person is low. Therefore, the collision can be appropriately detected. With this, after the collision is detected, the operation of the robot can be stopped by the control device (for example, a robot controller). Thus, the monitoring device becomes further suitable for the cooperative work performed by the robot and the operator.

When the area determining portion determines that the predetermined portion of the robot is not located within the predetermined area, the force monitoring portion may detect the collision by the second monitoring criterion including monitoring of impact force proportional to a differential value of the external force acting on the robot.

According to the above configuration, even if the robot collides with a person in the high speed operating area where the possibility that the robot collides with a person is low, the collision can be detected quickly. With this, the monitoring device becomes further suitable for the cooperative work performed by the robot and the operator.

The monitoring device of the robot system may further include: a position sensor configured to detect a rotation angle position of the servo motor; a speed calculating portion configured to calculate an operating speed of the robot based on the rotation angle position of the servo motor detected by the position sensor; and a speed monitoring portion configured to when the area determining portion determines that the predetermined portion of the robot is located within the predetermined area, monitor whether or not the operating speed of the robot is higher than a first speed and when the area determining portion determines that the predetermined portion of the robot is not located within the predetermined area, monitor whether or not the operating speed of the robot is higher than a second speed higher than the first speed, wherein when the area determining portion determines that the predetermined portion of the robot is located within the area, and the speed monitoring portion determines that the operating speed of the robot is higher than the first speed, or when the area determining portion determines that the predetermined portion of the robot is not located within the area, and the speed monitoring portion determines that the operating speed of the robot is higher than the second speed, the stop signal generating portion may generate a stop signal of the robot and supply the stop signal to the control device.

According to the above configuration, for example, in the high speed operating area where the possibility that the robot collides with a person is low, the robot is operated at high speed. Thus, the ability of the robot is maximally exerted. Further, whether or not the robot is operated at such a speed that a risk of injury is low even if the collision is detected can be monitored. On the other hand, in the low speed operating area where the possibility that the robot collides with a person is high, whether or not the robot is operated at such a speed that the robot is not pushed into a collided part of a person during a coasting operation performed from the collision detection until the stop can be monitored. To be specific, the convenience in the cooperative work performed by the robot and the operator working around the robot further improves by the speed monitoring in addition to the force monitoring.

The monitoring device of the robot system may be configured such that the predetermined area includes a plurality of areas preset in the operating range of the robot.

According to the above configuration, for example, the low speed operating area where the possibility that the robot collides with a person is high can be flexibly and appropriately set in accordance with the size and shape of a work area. Therefore, the convenience in the cooperative work performed by the robot and the operator working around the robot further improves.

At least one of the first monitoring criterion and the first speed may be different among the plurality of areas. For example, in the low speed operating area where the possibility that the robot collides with a person is high, the robot is operated at such a speed that the robot is not pushed into a collided part of a person during the coasting operation performed from the collision detection until the stop. The monitoring criterion (for example, a threshold of the operating speed or a threshold of the external force) is set depending on a part which is assumed to have a collision risk. For example, weight and risk are different between a hand and a body as the part having the collision risk, so that a speed to be set is different between the hand and the body.

According to the above configuration, the monitoring criterion (for example, a threshold of the speed or a threshold of the external force) is different among the respective areas. Therefore, the convenience in the cooperative work performed by the robot and the operator working around the robot further improves.

The monitoring device of the robot system may further include a current sensor configured to detect a current value flowing through the servo motor, wherein the external force detecting portion may include: a current torque converting portion configured to convert the current value, flowing through the servo motor and detected by the current sensor, to a torque value; a driving torque estimating portion configured to estimate driving torque necessary to drive the servo motor; a disturbance torque calculating portion configured to calculate as disturbance torque a difference between the torque value obtained by the current torque converting portion and an estimate value of the driving torque; and an external force calculating portion configured to calculate the external force, acting on the robot, by using the disturbance torque calculated by the disturbance torque calculating portion.

According to the above configuration, the external force acting on the robot is calculated based on the motor current value without using a force sensor. Therefore, the collision can be detected at low cost with a high degree of accuracy. Thus, the convenience in the cooperative work performed by the robot and the operator working around the robot further improves.

Advantageous Effects of Invention

According to the present invention, the monitoring device of the robot system in which the robot and a person work while coexisting with each other can perform the collision detection suitable for the cooperative work performed by the robot and the operator.

The above object, other objects, features, and advantages of the present invention will be made clear by the following detailed explanation of preferred embodiments with reference to the attached drawings.

DESCRIPTION OF EMBODIMENTS

Embodiments of the present invention will be explained with reference to the drawings. In the following explanations and the drawings, the same reference signs are used for the same or corresponding components, and a repetition of the same explanation is avoided.

Embodiment 1

Robot System

Figure 1:
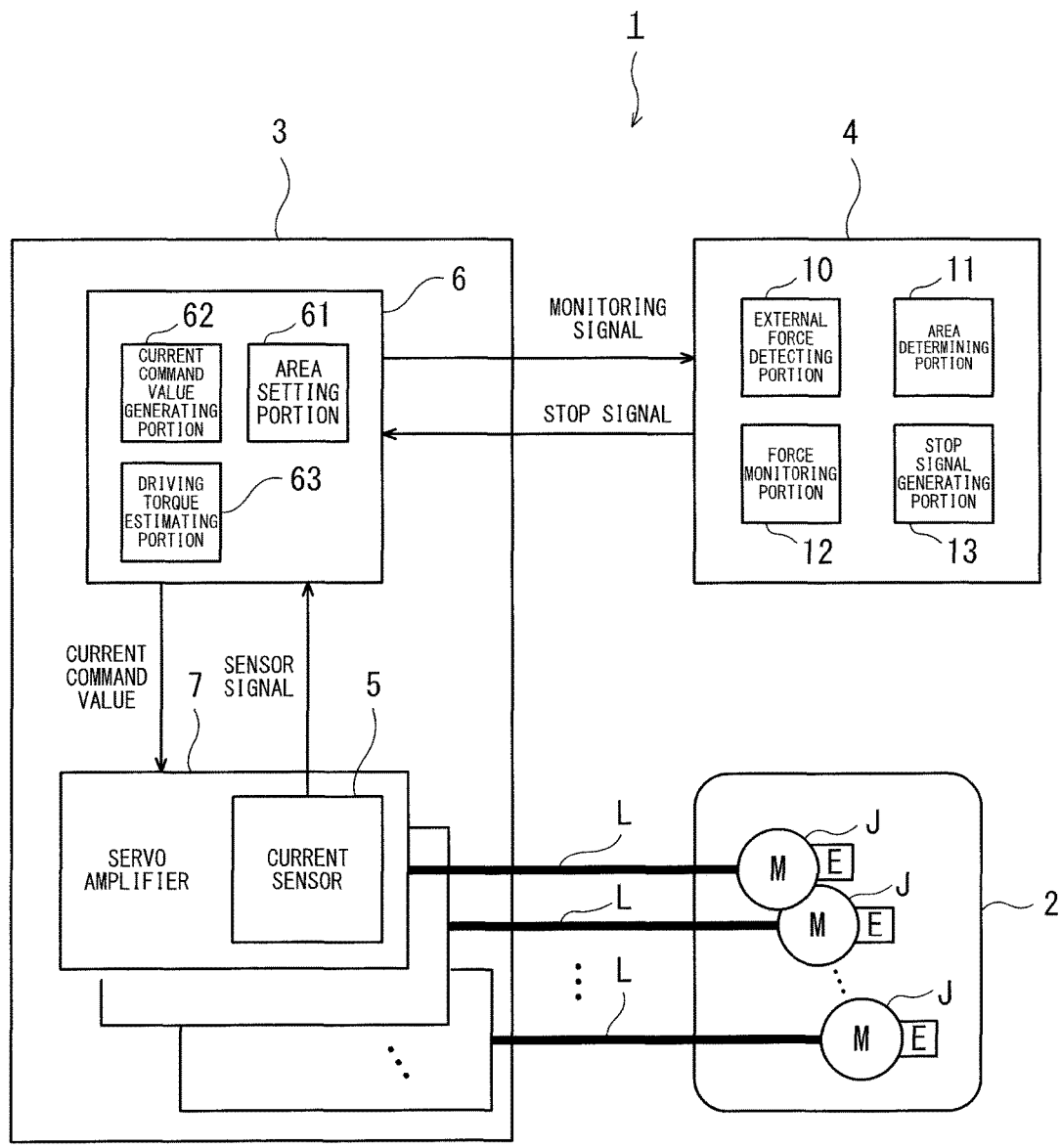
FIG. 1 is a block diagram showing an entire configuration of a robot system including a monitoring device according to Embodiment 1.

FIG. 1 is a block diagram showing an entire configuration of a robot system including a monitoring device according to Embodiment 1. As shown in FIG. 1, a robot system 1 includes a robot 2, a control device 3, and a monitoring device 4. The robot system 1 of the present embodiment is configured such that the robot 2 and an operator work cooperatively in the same work area. Therefore, for securing safety of operators around the robot system 1, the robot system 1 includes the monitoring device 4.

The robot 2 includes one or more joint shafts J and servo motors M configured to drive the joint shafts. A current sensor 5, a brake (not shown), and a position sensor E are provided for each of the servo motors M. The current sensor 5 detects a current that drives the corresponding servo motor M. The brake (not shown) brakes rotation of the corresponding servo motor M. The position sensor F, such as an encoder, detects a rotation angle position of the corresponding servo motor M. The rotation angle position denotes a position of an angle of the joint shaft J in a joint coordinate system of the servo motor M (hereinafter also referred to as a "joint shaft angle position").

The control device 3 is connected to the robot 2 through cables L (shown by thick lines). Each of the cables L includes: a power supply line through which the control device 3 supplies power to the servo motor M of the joint shaft the brake, and the like; a signal line through which the control device 3 receives a sensor signal from the position sensor E attached to the servo motor M; and the like. The control device 3 is also connected to the monitoring device 4 through a communication cable (not shown). The communication cable is a cable for serial communication, such as RS422. The control device 3 supplies a monitoring signal to the monitoring device 4 through the communication cable and has a stop function of stopping an operation of the robot 2 when the control device 3 receives a stop signal from the monitoring device 4.

The control device 3 is a robot controller including an arithmetic processing unit 6, servo amplifiers 7, a memory, an input/output interface, a communication interface, and the like. The arithmetic processing unit 6 includes an area setting portion 61, a current command value generating portion 62, and a driving torque estimating portion 63. Each of these portions (61 to 63) is a functional block realized by executing a predetermined program in the arithmetic processing unit 6. The area setting portion 61 presets a predetermined area in an operating range of the robot 2. The predetermined area is set based on, for example, a reference coordinate system of the robot 2. The current command value generating portion 62 calculates a current command value based on a predetermined position command value and the joint shaft angle position from the position sensor and outputs the current command value to each of the servo amplifiers 7. The servo amplifiers 7 are provided so as to correspond to the servo motors M. Each of the servo amplifiers 7 generates a current based on the supplied current command value and supplies the generated current to the servo motor M through the cable L. To be specific, the servo amplifier 7 is an amplifier configured to generate a driving current of the servo motor M in accordance with the current command value. As above, the control device 3 controls the operation of the robot 2 by performing, based on the position command value, position control of the servo motor M provided at the joint shaft J. In the present embodiment, the control device 3 performs area control of the robot 2. Specifically, when a predetermined portion (for example, a hand tip part) of the robot 2 is located within the predetermined area, the control device 3 controls the operation of the robot 2 such that an operating speed (maximum speed) of the robot 2 becomes a first speed or less. When the predetermined portion of the robot 2 is not located within the predetermined area, the control device 3 controls the operation of the robot 2 such that the operating speed (maximum speed) of the robot 2 becomes a second speed or less, the second speed being higher than the first speed.

The driving torque estimating portion 63 estimates driving torque from the joint shaft angle position calculated by the position sensor E, the driving torque being necessary to drive the servo motor M of the joint shaft J of the robot 2. In the present embodiment, the driving torque estimating portion 63 calculates gravity torque, inertial force torque, and frictional force torque and performs addition of these to obtain a driving torque estimate value. The gravity torque is torque for overcoming the weight of each link to maintain the posture of the link. The inertial force torque is torque necessary to overcome inertial force of each link. The frictional force torque is torque necessary to overcome frictional force of a reducer. The driving torque estimate value is transmitted as the monitoring signal from the control device 3 to the monitoring device 4 together with the sensor signal including a sensor current value detected by the current sensor 5 and the joint shaft angle position detected by the position sensor E.

Monitoring Device

The monitoring device 4 is configured to monitor the operation of the robot 2 in the robot system 1 to detect collision of the robot 2. When the monitoring device 4 receives the monitoring signal of the robot 2 from the control device 3 and detects the collision, the monitoring device 4 supplies the stop signal to the control device 3. To improve safety of an operator who works together with the robot 2, the monitoring device 4 is provided independently from the control device 3. For example, the control device 3 and the monitoring device 4 are accommodated in one casing.

The monitoring device 4 includes an external force detecting portion 10, an area determining portion 11, a force monitoring portion 12, and a stop signal generating portion 13. The external force detecting portion 10 detects external force acting on the robot 2. Based on the rotation angle positions of the servo motors M detected by the position sensors E, the area determining portion 11 determines whether or not the predetermined portion of the robot 2 is located within the predetermined area. When the area determining portion 11 determines that the predetermined portion of the robot 2 is located within the predetermined area, the force monitoring portion 12 detects the collision based on a first monitoring criterion including at least the monitoring of the external force acting on the robot 2. When the area determining portion 11 determines that the predetermined portion of the robot 2 is not located within the predetermined area, the force monitoring portion 12 detects the collision based on a second monitoring criterion not including the monitoring of the external force. When the force monitoring portion 12 detects the collision, the stop signal generating portion 13 generates the stop signal of the robot 2 and supplies the stop signal to the control device 3. The monitoring device 4 is a computer including one or more processors, a memory, an input/output interface, a communication interface, and the like. The monitoring device 4 includes a component by which a threshold in collision detection is adjustable to an arbitrary value by an administrator. Each of the portions (10 to 13) is a functional block realized by executing a predetermined program by the processor.

Figure 2:
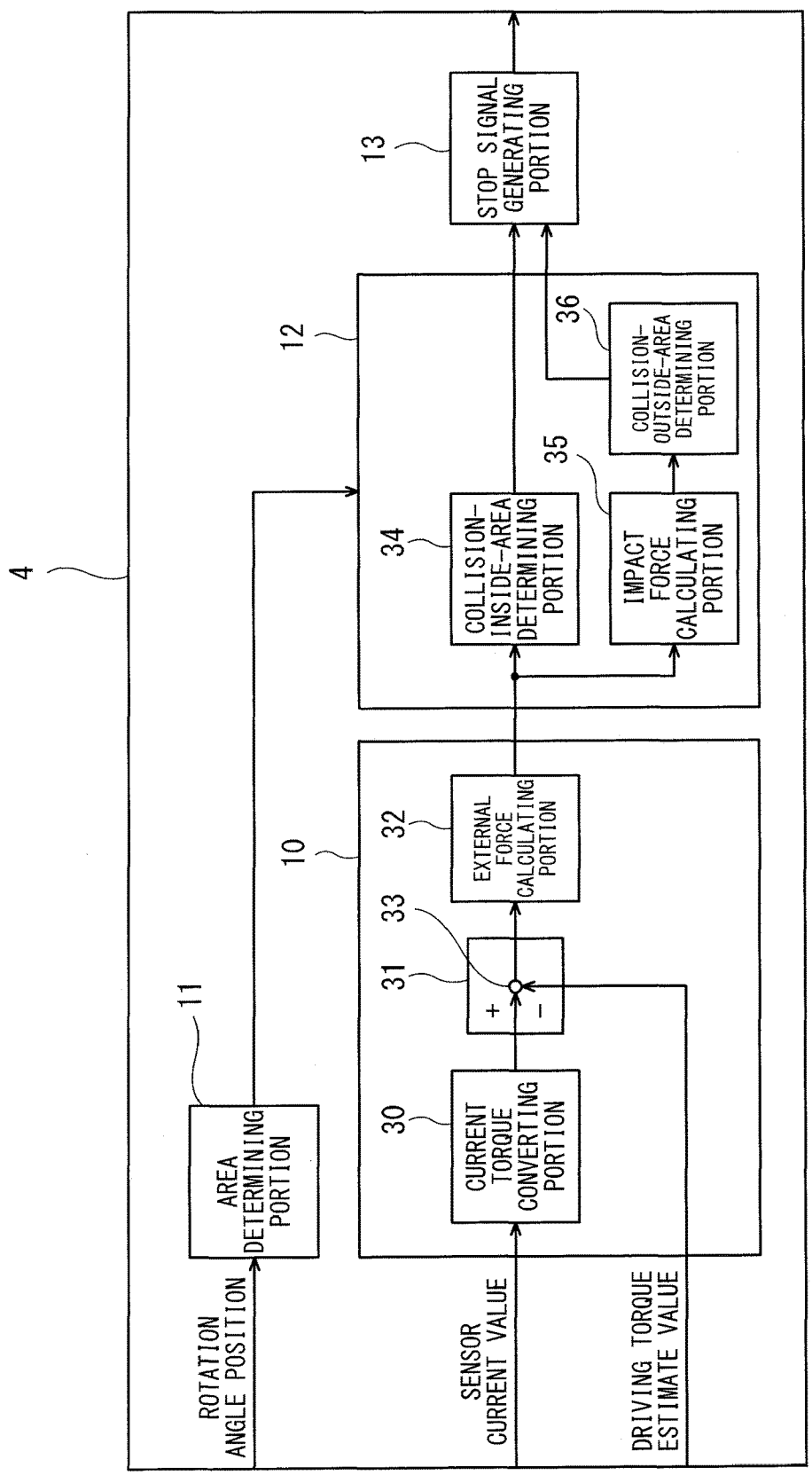
FIG. 2 is a block diagram showing a specific configuration of the monitoring device of FIG. 1.

Next, a specific configuration of the monitoring device 4 will be explained with reference to a block diagram of FIG. 2. As shown in FIG. 2, the external force detecting portion 10 includes a current torque converting portion 30, a disturbance torque calculating portion 31, and an external force calculating portion 32. The current torque converting portion 30 converts the sensor current value, flowing through the servo motor M and detected by the current sensor 5, to a torque value. The sensor current value included in the monitoring signal is transmitted from the control device 3 through the communication cable to the monitoring device 4 and input to the current torque converting portion 30. The current torque converting portion 30 converts the input sensor current value to the torque value and outputs the torque value to the disturbance torque calculating portion 31. The disturbance torque calculating portion 31 calculates as disturbance torque a difference between the torque value obtained by the current torque converting portion 30 and the driving torque estimate value. After the driving torque estimate value is obtained by the driving torque estimating portion 63 (see FIG. 1), the driving torque estimate value is transmitted as the monitoring signal from the control device 3 through the communication cable to the monitoring device 4 and input to the disturbance torque calculating portion 31. In the present embodiment, the control device 3 includes the driving torque estimating portion 63. However, the monitoring device 4 may include the driving torque estimating portion 63. In the present embodiment, the disturbance torque calculating portion 31 includes an adder-subtracter 33. The adder-subtracter 33 calculates the disturbance torque by subtracting the driving torque estimate value, input from the driving torque estimating portion 63, from the torque value of the servo motor M input from the current torque converting portion 30. Then, the adder-subtracter 33 outputs the disturbance torque to the external force calculating portion 32. The external force calculating portion 32 calculates the external force, acting on the robot 2, by using the disturbance torque calculated by the disturbance torque calculating portion 31 and outputs the external force to the force monitoring portion 12.

Based on the rotation angle positions of the servo motors M detected by the position sensors E, the area determining portion 11 determines whether or not the predetermined portion of the robot 2 is located within the predetermined area. The rotation angle positions of the servo motors M included in the monitoring signal are transmitted from the control device 3 through the communication cable to the monitoring device 4 and input to the area determining portion 11. The area determining portion 11 generates a three-dimensional model of the robot 2 based on information, such as the rotation angle positions of the servo motors M and the preset lengths and shapes of the links. The area determining portion 11 determines whether or not a predetermined portion (for example, a hand tip part) of the three-dimensional model of the robot 2 is located within the predetermined area. Then, the area determining portion 11 outputs the determination result to the force monitoring portion 12.

The force monitoring portion 12 includes a collision-inside-area determining portion 34, an impact force calculating portion 35, and a collision-outside-area determining portion 36. When the area determining portion 11 determines that the predetermined portion of the robot 2 is located within the predetermined area, the collision-inside-area determining portion 34 detects the collision by the first monitoring criterion including at least the monitoring of the external force acting on the robot 2. In the present embodiment, the collision-inside-area determining portion 34 determines whether or not a value $|f_d|$ of the external force input from the external force calculating portion 32 has exceeded a preset first threshold $f_{th1}$. When the value $|f_d|$ of the external force has exceeded the first threshold $f_{th1}$, the collision-inside-area determining portion 34 determines that the robot 2 has collided. Then, the collision-inside-area determining portion 34 generates a collision detection signal and outputs the collision detection signal to the stop signal generating portion 13. In the present embodiment, the first threshold $f_{th1}$ is set to 100 N. The value $|f_d|$ of the external force as a value compared with the first threshold $f_{th1}$ is a scalar value of external force $f_d$.

The impact force calculating portion 35 calculates the impact force acting on the robot 2. In the present embodiment, the impact force calculating portion 35 calculates, as the impact force acting on the robot 2, a value $f'_d$ proportional to a differential value of a value $f_d$ of the external force input from the external force calculating portion 32. Then, the impact force calculating portion 35 outputs the value $f'_d$ to the collision-outside-area determining portion 36. When the area determining portion 11 determines that the predetermined portion of the robot 2 is not located within the predetermined area, the collision-outside-area determining portion 36 detects the collision by the second monitoring criterion including the monitoring of the impact force acting on the robot 2. The collision-outside-area determining portion 36 determines whether or not a value $|f'_d|$ of the impact force input from the impact force calculating portion 35 and acting on the robot 2 has exceeded a preset second threshold $f_{th2}$. When the value $|f'_d|$ of the impact force has exceeded the second threshold $f_{th2}$, the collision-outside-area determining portion 36 determines that the robot 2 has collided. Then, the collision-outside-area determining portion 36 generates the collision detection signal and outputs the collision detection signal to the stop signal generating portion 13. The value $|f'_d|$ of the impact force as a value compared with the second threshold $f_{th2}$ is a scalar value of the external force $f'_d$.

When the collision detection signal is input from the force monitoring portion 12 to the stop signal generating portion 13, the stop signal generating portion 13 generates the stop signal of the robot 2 and outputs the stop signal to the control device 3.

Robot

Figure 3:
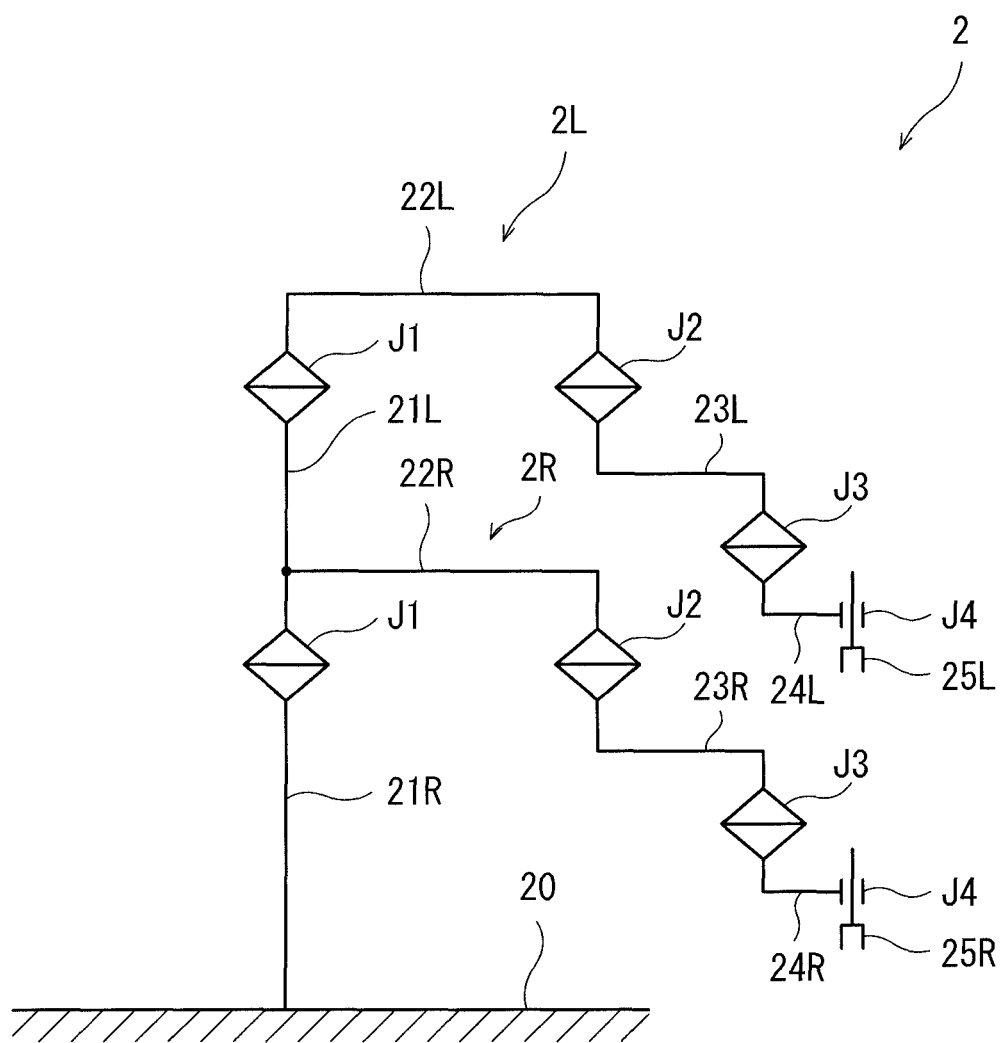
FIG. 3 is a diagram schematically showing a joint structure of a robot of FIG. 1.

Next, a specific configuration of the robot 2 will be explained with reference to the drawings. FIG. 3 is a diagram schematically showing a joint structure of the robot 2. The robot 2 of the present embodiment is a coaxial double-arm type horizontal articulated robot. As shown in FIG. 3, a left arm 2L includes: first, second, and third joint shafts J1, J2, and J3 as rotary joint shafts; and a fourth joint shaft J4 as a translation (linear motion) joint shaft. A right arm 2R includes: first, second, and third joint shafts J1, J2, and J3 as rotary joint shafts; and a fourth joint shaft J4 as a translation (linear motion) joint shaft.

The right arm 2R is configured by coupling a supporting member 21R, a first right link 22R, a second right link 23R, a third right link 24R, and a right end effector 25R by the joint shafts. In the right arm 2R, the supporting member 21R is provided on an upper surface of a base 20, and one end portion of the first right link 22R extending horizontally is coupled to the supporting member 21R through the first joint shaft J1 having a rotation axis vertical to the base 20. The other end portion of the first right link 22R is coupled to one end of the second right link 23R through the second joint shaft J2 having a vertical rotation axis. The second right link 23R extends horizontally. The other end portion of the second right link 23R is coupled to one end of the third right link 24R through the third joint shaft J3 having a vertical rotation axis. The third right link 24R extends horizontally. The right end effector 25R is coupled to the other end portion of the third right link 24R through the fourth joint shaft J4 having a vertical translational direction.

The left arm 2L is configured by coupling a supporting member 21L, a first left link 22L, a second left link 23L, a third left link 24L, and a left end effector 25L by the joint shafts. In the left arm 2L, the supporting member 21L is provided on an upper surface of the first right link 22R of the right arm 2R, and one end portion of the first left link 22L extending horizontally is coupled to the supporting member 21L through the first joint shaft J1 having a vertical rotation axis. The first joint shaft J1 of the left arm 2L is arranged such that the rotation axis of the first joint shaft J1 of the left arm 2L coincides with the rotation axis of the first joint shaft J1 of the right arm 2R. The other end portion of the first left link 22L is coupled to one end of the second left link 23L through the second joint shaft J2 having a vertical rotation axis. The second left link 23L extends horizontally. The other end portion of the second left link 23L is coupled to one end of the third left link 24L through the third joint shaft J3 having a vertical rotation axis. The third left link 24L extends horizontally. The left end effector 25L is coupled to the other end portion of the third left link 24L through the fourth joint shaft J4 having a vertical translational direction. As above, each of the left and right arms 2L and 2R of the robot 2 has 4 degrees of freedom and is provided with the end effector at a tip end thereof.

Each of the joint shafts J1 to J4 constituting the right arm 2R and the left arm 2L is driven by a servo mechanism (not shown). The servo mechanism includes: a driving portion configured to displace the arm; and a transmitting mechanism configured to transmit power of the driving portion to the arm. In the present embodiment, the driving portion is realized by, for example, a servo motor (see FIG. 1). The position sensors E, such as encoders, each configured to detect the rotation angle position are provided at the respective servo motors M (see FIG. 1). The control device 3 performs position control of the servo motors M to control the operations of the right and left arms 2R and 2L at arbitrary speed. The first joint shaft J1 of the left arm 2L is connected to the first joint shaft J1 of the right arm 2R through the supporting member 21L and the first right link 22R of the right arm 2R so as to share the rotation axis with the first joint shaft J1 of the right arm 2R. Therefore, the first joint shaft J1 of the left arm 2L rotates so as to cancel the rotation of the first joint shaft J1 of the right arm 2R and is controlled so as to perform given rotation.

Figure 4:
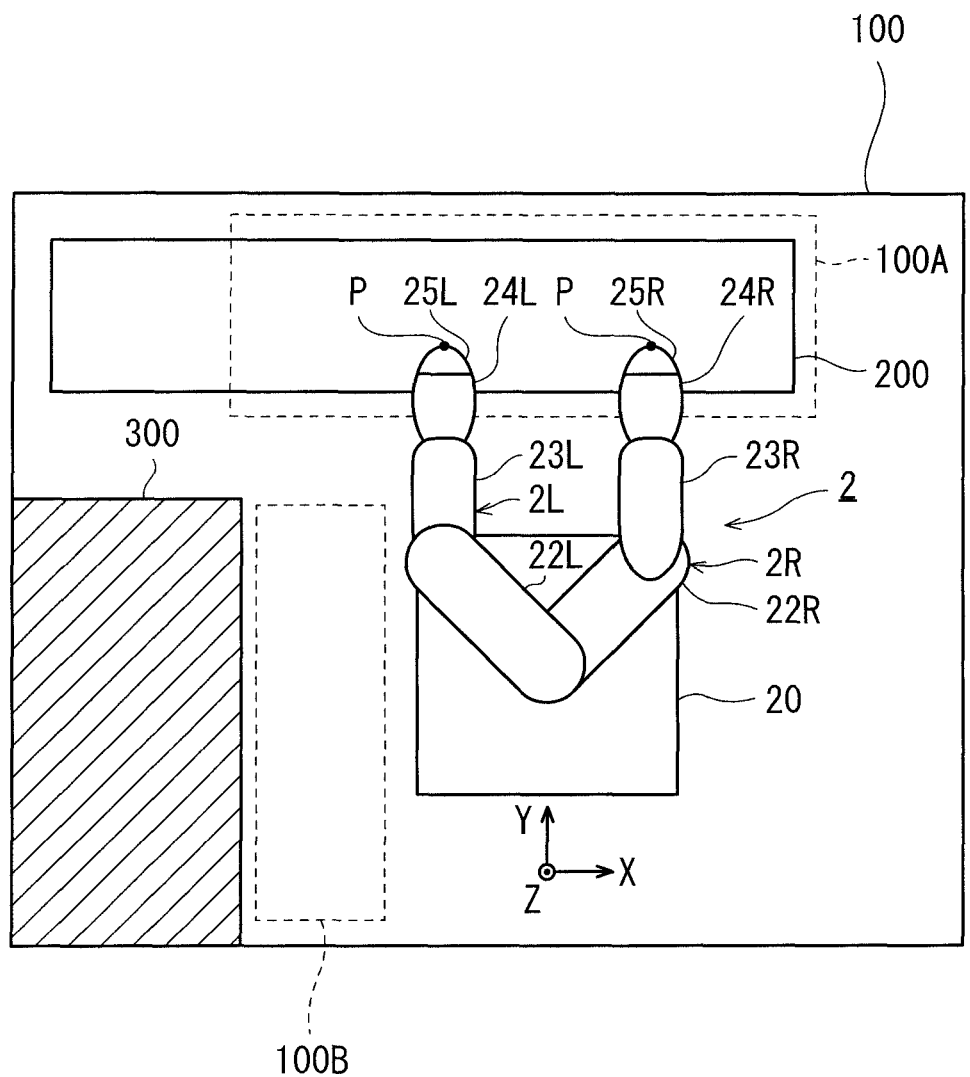
FIG. 4 is a plan view showing a configuration of the robot of FIG. 3.

FIG. 4 is a plan view showing the configuration of the robot 2. As shown in FIG. 4, the base 20 of the robot 2 is provided at a middle of a work space 100 having a square shape. A worktable 200 having a rectangular shape in a plan view is provided in front of the robot 2. For example, a work object (workpiece) is arranged on the worktable 200. The base 20 of the robot 2 is provided so as to be spaced apart from a wall 300 by a predetermined interval, the wall 300 being provided at the work space 100. The robot 2 is set so as to perform the same work as the operator in the work space 100.

The robot 2 includes a reference coordinate system (hereinafter referred to as a "base coordinate system"). For example, this coordinate system is set such that: an origin is an intersection, point between an installation surface of the base 20 and the rotation axis of the first joint shaft J1 (see FIG. 3) of the right arm 2R; a z-axis is the rotation axis of the first joint shaft J1; an x-axis is an arbitrary axis perpendicular to the z-axis; and a y-axis is an axis perpendicular to the z-axis and the x-axis. The operating range of the robot 2 with respect to the right and left arms 2R and 2L is set based on the base coordinate system. It should be noted that the operating range is a circular range (not shown) about the first joint shaft J1 of the left arm 2L and the first joint shaft J1 of the right arm 2R. In the present embodiment, two areas 100A and 100B are set in an operating region of the robot 2. The area 100A is set as a predetermined three-dimensional space (having a rectangular shape in a plan view) covering an upper surface of the worktable 200. The area 100B is set as a predetermined three-dimensional space (having a rectangular shape in a plan view) between the wall 300 and the base 20. The areas 100A and 100B are regarded as regions where a possibility that the robot 2 collides with a person is low. It should be noted that each of the areas 100A and 100B may be a curved space in a plan view as long as each of the areas 100A and 100B is the predetermined three-dimensional space. Further, a part other than the areas 100A and 100B in the operating range of the robot 2 is set as an outside-area region. The outside-area region is regarded as a region where the possibility that the robot 2 collides with a person is high.

When the predetermined portion of the robot 2 is located within the area 100A or 100B, the control device 3 operates the robot 2 at the first speed or less. When the predetermined portion of the robot 2 is not located within any of the predetermined areas 100A and 100B (i.e., located within the outside-area region), the control device 3 operates the robot 2 at the second speed or less, the second speed being higher than the first speed. In the present embodiment, the predetermined portion of the robot 2 is a tool center point P of the right end effector 25R of the robot 2 or a tool center point P of the left end effector 25L of the robot 2 (hereinafter simply referred to as the "tool center point P"). Further, operating the robot 2 denotes operating the right arm 2R or left arm 2L of the robot 2. The first speed is set to 250 mm/s defined as low-speed control in ISO10218-1. The second speed is set to, for example, 800 mm/s. With this, while controlling the robot 2 at low speed in the areas 100A and 100B, the robot 2 can be operated at as high a speed as possible in the outside-area region. Therefore, the work efficiency of the robot 2 improves.

Monitoring of Robot

Next, monitoring of the operation of the robot 2 in the robot system 1 will be explained with reference to the flow charts of FIGS. 5 and 6. First, the control device 3 executes area control of the robot 2 (Step S51 in FIG. 5). As shown in FIG. 4, when the tool center point P of the robot 2 is located within the area 100A or 100B, the control device 3 controls the arm 2R or 2L of the robot 2 such that the operating speed becomes the first speed or less. When the tool center point P of the robot 2 is not located within any of the areas 100A and 100B, the control device 3 controls the arm 2R or 2L of the robot 2 such that the operating speed of the robot 2 becomes the second speed or less.

Figure 5:
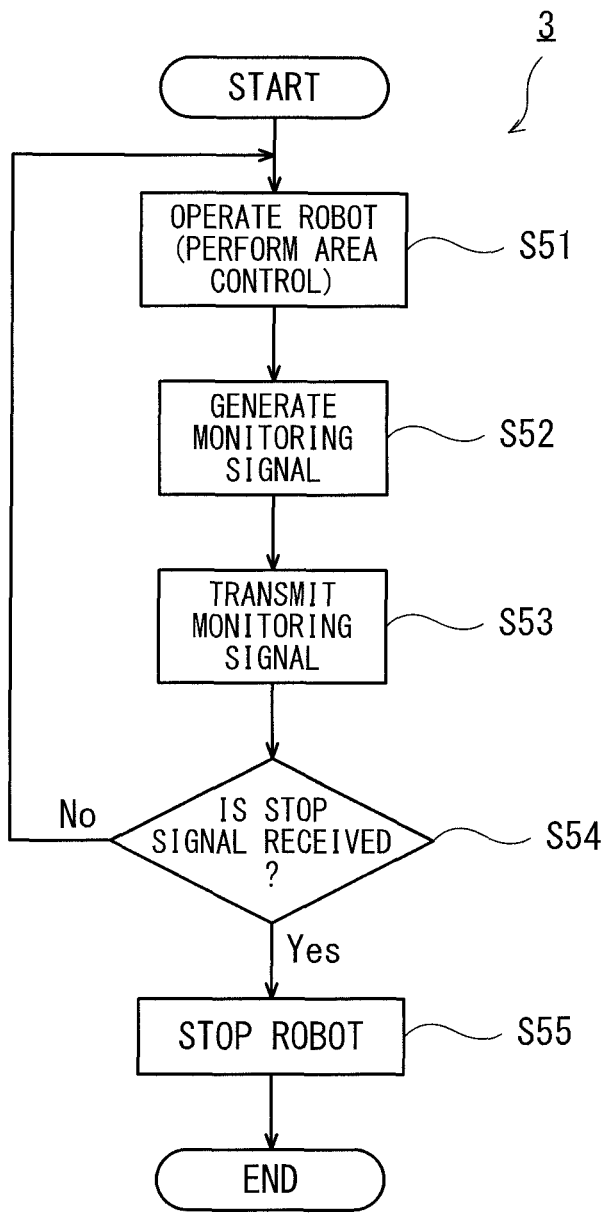
FIG. 5 is a flow chart showing a flow of robot control of a control device of FIG. 1.

Further, the control device 3 generates the monitoring signal necessary to monitor the operation of the robot 2 (Step S52 in FIG. 5). Specifically, as the monitoring signal, the control device 3 detects by the current sensor 5 the sensor current value flowing through the servo motor M in the robot 2 in operation, detects the rotation angle position of the servo motor M by the position sensor E, and estimates by the driving torque estimating portion 63 the driving torque estimate value necessary to drive the servo motor M (see FIG. 1). Next, the control device 3 transmits the monitoring signal, generated in Step S52, to the monitoring device 4 for every predetermined period (Step S53 in FIG. 5). The monitoring signal includes: the sensor current values flowing through the servo motors M and detected by the current sensors 5 in the robot 2 in operation; the rotation angle positions of the servo motors M detected by the position sensors E; and the driving torque estimate values calculated by the driving torque estimating portion 63 and necessary to drive the servo motors M.

Figure 6:
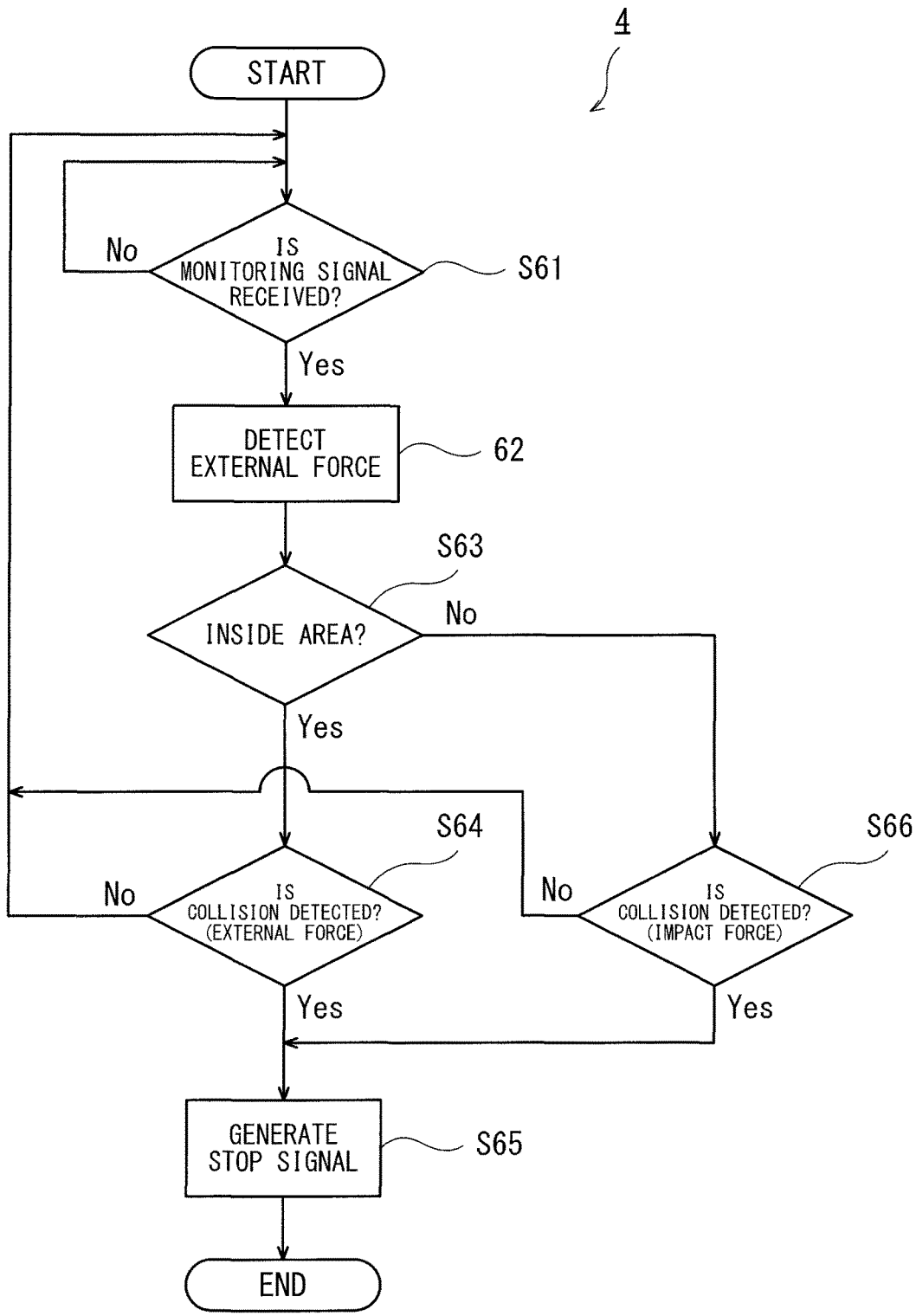
FIG. 6 is a flow chart showing a flow of force monitoring processing of the monitoring device of FIG. 2.

On the other hand, the monitoring device 4 stands by for the reception of the monitoring signal transmitted from the control device 3 for every predetermined period (Step S61 in FIG. 6). When the monitoring device 4 receives the monitoring signal, the external force detecting portion 10 detects the external force (Step S62 in FIG. 6). Specifically, the current torque converting portion 30 shown in FIG. 2 converts the sensor current value, flowing through each of servo motors M1 to M6 and detected by the current sensor 5, to the torque value. The current torque converting portion 30 converts the input sensor current value to the torque value and outputs the torque value to the disturbance torque calculating portion 31. Next, the disturbance torque calculating portion 31 of FIG. 2 calculates as the disturbance torque the difference between the torque value obtained by the torque current converting portion 30 and the driving torque estimate value. Then, the disturbance torque calculating portion 31 outputs the disturbance torque to the external force calculating portion 32. Next, the external force calculating portion 32 of FIG. 2 calculates the external force, acting on the robot 2, by using the disturbance torque calculated by the disturbance torque calculating portion 31. As shown by Formula (1) below, the external force calculating portion 32 calculates the external force $f_d$, acting on the tip end (tool center point P) of the robot 2, from disturbance torque $\tau_d$ input from the disturbance torque calculating portion 31 by the principle of virtual work.

$$f_d = (A^T)^{-1} \tau_d \tag{1}$$

In Formula (1), A denotes a Jacobian matrix and is a matrix showing a minute displacement relationship between the coordinate system of the robot 2 and the joint coordinate system. Regarding the Jacobian matrix A, an error $\Delta x$, and a joint angle difference $\Delta\theta$, Formula (2) below is established.

$$\Delta x = A \Delta \theta \tag{2}$$

As in Formula (1), the external force calculating portion 32 calculates the external force $f_d$, acting on the robot 2, by multiplying the disturbance torque $\tau_d$ by an inverse matrix of a transposed matrix $A^T$ of the Jacobian matrix A. Then, the external force calculating portion 32 outputs the external force $f_d$ to the force monitoring portion 12. The external force $f_d$ of Formula (1) denotes external force which is assumed to be acting on the tip end (tool center point P) of the robot 2. When the external force $f_d$ acts on an action point other than the tip end of the robot 2, coordinate transformation of the external force $f_d$ may be performed to obtain external force at the actual action point.

On the other hand, the monitoring device 4 (area determining portion 11) determines based on the rotation angle positions of the servo motors M detected by the position sensors E whether or not the tool center point P of the robot 2 is located within the area 100A or 100B (Step S63 in FIG. 6). The area determining portion 11 generates the three-dimensional model of the robot 2 based on information, such as the rotation angle positions of the servo motors M and the preset lengths and shapes of the links. The area determining portion 11 determines whether or not the tool center point P of the three-dimensional model of the robot 2 is located within the area 100A or 100B. Then, the area determining portion 11 outputs the determination result to the force monitoring portion 12.

Next, when the area determining portion 11 determines that the tool center point P of the robot 2 is located within the area 100A or 100B (YES in Step S63 of FIG. 6), the monitoring device 4 (collision-inside-area determining portion 34) detects the collision by the first monitoring criterion including the monitoring of the external force acting on the robot 2. In the present embodiment, the collision-inside-area determining portion 34 determines whether or not the value $f_d$ of the external force input from the external force calculating portion 32 has exceeded the preset first threshold $f_{th1}$. When the value $f_d$ of the external force has exceeded the first threshold $f_{th1}$, the collision-inside-area determining portion 34 determines that the robot 2 has collided. Then, the collision-inside-area determining portion 34 generates the collision detection signal and outputs the collision detection signal to the stop signal generating portion 13. The value $|f_d|$ of the external force as a value compared with the first threshold $f_{th1}$ is a scalar value of the external force $f_d$. When the monitoring device 4 does not detect the collision, the monitoring device 4 returns to Step S61 and stands by for the reception of the monitoring signal.

On the other hand, when the area determining portion 11 determines that the tool center point P of the robot 2 is not located within any of the areas 100A and 100B, the monitoring device 4 (collision-outside-area determining portion 36) detects the collision by the second monitoring criterion including the monitoring of the impact force acting on the robot 2 (Step S66 in FIG. 6). Specifically, the collision-outside-area determining portion 36 determines whether or not the value $|f'_d|$ of the impact force input from the impact force calculating portion 35 and acting on the robot 2 has exceeded the preset second threshold $f_{th2}$. When the value $|f'_d|$ of the impact force has exceeded the second threshold $f_{th2}$, the collision-outside-area determining portion 36 determines that the robot 2 has collided. Then, the collision-outside-area determining portion 36 generates the collision detection signal and outputs the collision detection signal to the stop signal generating portion 13. The value $|f'_d|$ of the impact force as a value compared with the second threshold $f_{th2}$ is a scalar value of the external force $f'_d$. When the monitoring device 4 does not detect the collision, the monitoring device 4 returns to Step S61 and stands by for the reception of the monitoring signal. With this, even if the robot 2 collides with a person in the outside-area region as a high speed operating region, the collision can be detected quickly.

Next, when the collision detection signal (the external three or the impact force) is input from the force monitoring portion 12, the monitoring device 4 (stop signal generating portion 13) generates the stop signal of the robot 2 and outputs the stop signal to the control device 3 (Step S65 of FIG. 6).

When the control device 3 receives the stop signal from the monitoring device 4 (YES in Step S54 of FIG. 5), the control device 3 stops the operation of the robot 2 (Step S55 in FIG. 5). A method of stopping the robot 2 is optional. For example, the robot 2 may be instantly stopped by power cut off (so-called emergency stop), may be stopped by power cut off and deceleration (so-called deceleration stop),or may be stopped by deceleration without power cut off (so-called temporary stop). When the control device 3 does not receive the stop signal, the control device 3 returns to Step S51 and continues the area control of the robot 2.

Therefore, according to the present embodiment, since the monitoring criterion is different between the area 100A or 100B as a low speed operating region where the possibility that the robot 2 collides with a person is high and the outside-area region as the high speed operating region where the possibility that the robot 2 collides with a person is low, the collision can be appropriately detected. With this, after the collision is detected, the operation of the robot can be stopped by the control device 3, so that safety of operators working around the robot 2 can be secured.

Further, according to the monitoring device of the robot system 1 of the present embodiment, the two areas 100A and 100B are preset in the operating range of the robot 2. Therefore, the areas 100A and 100B can be flexibly and appropriately set depending on the size and shape of the work space 100. Thus, the convenience in the cooperative work performed by the robot 2 and the operator working around the robot 2 further improves.

In the present embodiment, the first monitoring criterion of the external force is set to the same value (100 N) between the areas 100A and 100B set as the low speed operating regions in the operating range of the robot 2. However, the present embodiment is not limited to this. The first monitoring criterion may be different between the areas 100A, and 100B. For example, in a low speed operating area where the possibility that the robot 2 collides with a person is high, the robot is operated at such a speed that the robot is not pushed into a collided part of a person during a coasting operation performed from the collision detection until the stop. The monitoring criterion (for example, a threshold of the operating speed or a threshold of the external force) is set depending on a part which is assumed to have a collision risk. For example, weight and risk are different between a hand and a body as the part having the collision risk, so that a speed to be set is different between the hand and the body. With this, the convenience in the cooperative work performed by the robot and the operator working around the robot further improves.

Embodiment 2

Next, Embodiment 2 will be explained. Hereinafter, explanations of the same components as Embodiment 1 are omitted, and different components from Embodiment 1 will be explained.

Figure 7:
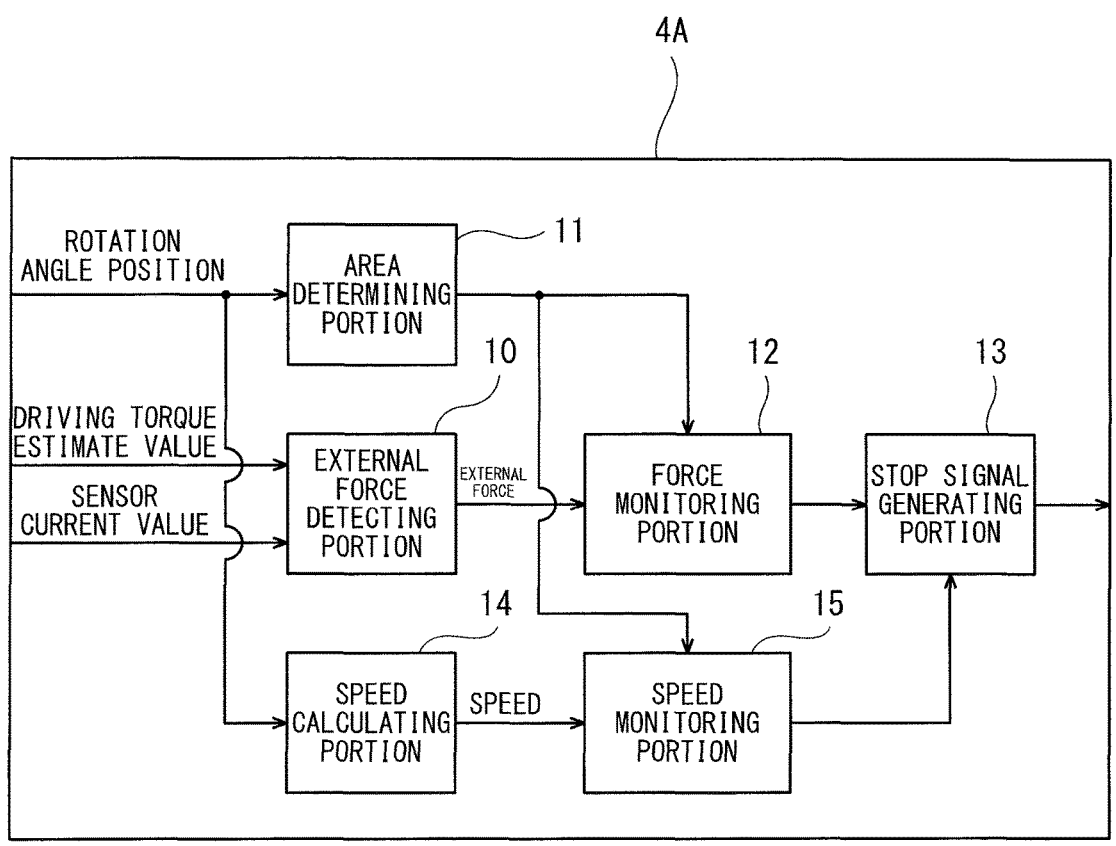
FIG. 7 is a block diagram showing a configuration of the monitoring device according to Embodiment 2.

FIG. 7 is a block diagram showing the configuration of the monitoring device according to Embodiment 2. As shown in FIG. 7, the present embodiment is different from Embodiment 1 (FIG. 1) in that a monitoring device 4A further includes a speed calculating portion 14 and a speed monitoring portion 15.

The speed calculating portion 14 calculates the operating speed of the robot 2 based on the rotation angle positions of the servo motors M detected by the position sensors E. The rotation angle positions of the servo motors M included in the monitoring signal are transmitted from the control device 3 through the communication cable to the monitoring device 4 and input to the speed calculating portion 14. The speed calculating portion 14 outputs the calculation result to the speed monitoring portion 15.

When the area determining portion 11 determines that the predetermined portion of the robot 2 is located within the predetermined area 100A or 100B, the speed monitoring portion 15 monitors whether or not the operating speed of the robot 2 is higher than the first speed. When the area determining portion 11 determines that the predetermined portion of the robot 2 is not located within any of the predetermined areas 100A and 100B, the speed monitoring portion 15 monitors whether or not the operating speed of the robot 2 is higher than the second speed higher than the first speed. In the present embodiment, the first speed is set to 250 mm/s, and the second speed is set to 800 mm/s.

When the area determining portion 11 determines that the predetermined portion of the robot 2 is located within the area 100A or 100B, and the speed monitoring portion 15 determines that the operating speed of the robot 2 is higher than the first speed, or when the area determining portion 11 determines that the predetermined portion of the robot is not located within any of the areas 100A and 100B, and the speed monitoring portion 15 determines that the operating speed of the robot 2 is higher than the second speed, the stop signal generating portion 13 generates the stop signal of the robot 2 and supplies the stop signal to the control device 3.

Figure 8:
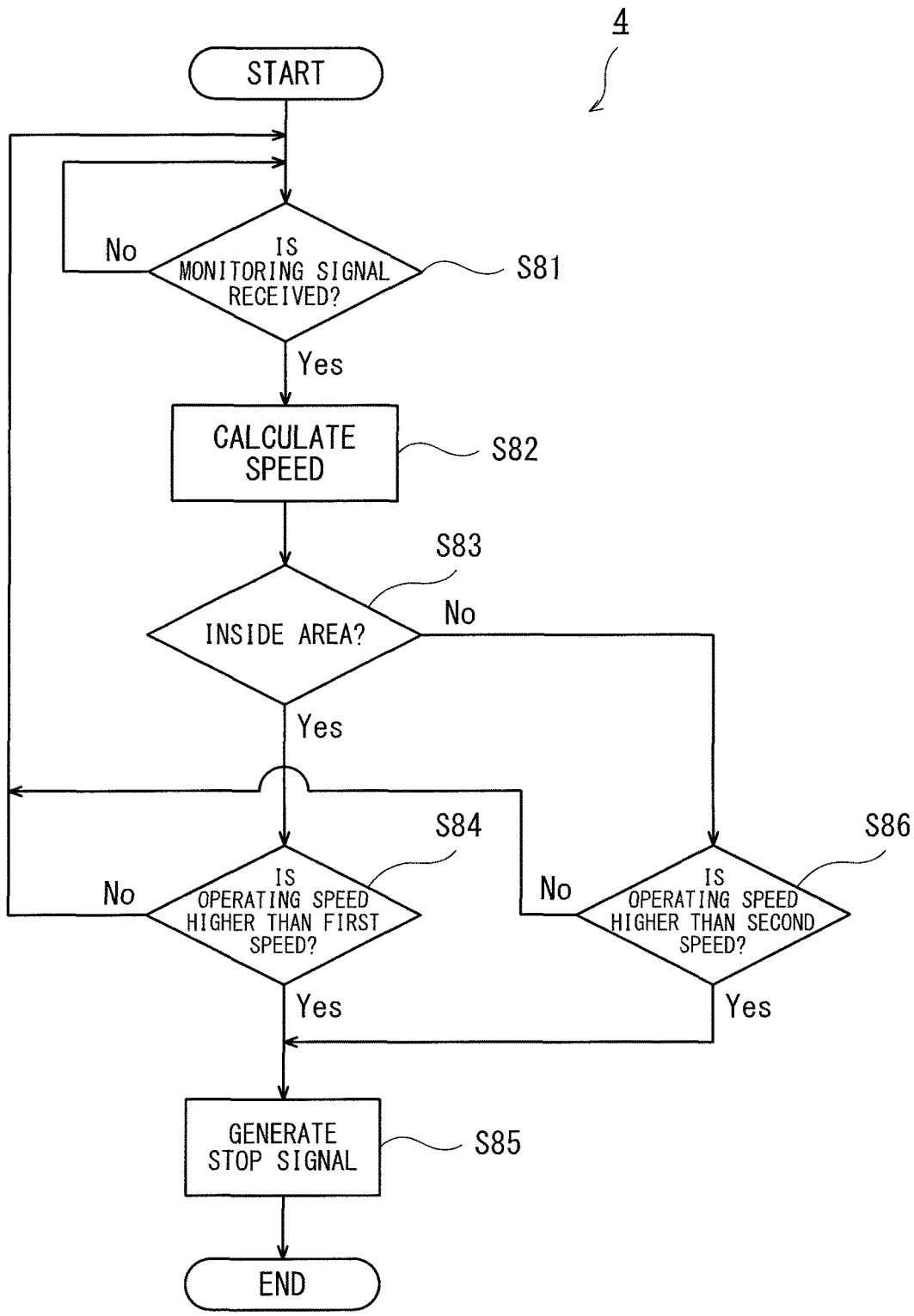
FIG. 8 is a flow chart showing a flow of speed monitoring processing of the monitoring device of FIG. 7.

FIG. 8 is a flow chart showing the flow of speed monitoring processing of the monitoring device 4A. As shown in FIG. 8, the monitoring device 4A stands by for reception of the monitoring signal transmitted from the control device 3 for every predetermined period (Step S81 in FIG. 8). When the monitoring device 4A (speed calculating portion 14) receives the monitoring signal, the monitoring device 4A (speed calculating portion 14) calculates the operating speed of the robot 2 based on the rotation angle positions of the servo motors M detected by the position sensors E (Step S82 in FIG. 8). The rotation angle positions of the servo motors M included in the monitoring signal are transmitted from the control device 3 through the communication cable to the monitoring device 4 and input to the speed calculating portion 14. Based on information about the rotation angle positions of the servo motors M, the speed calculating portion 14 calculates position coordinates (X, Y, Z) of the tool center point P of the robot 2 in the base coordinate system and the speed of the tool center point P. Then, the speed calculating portion 14 outputs the calculation results to the speed monitoring portion 15 (see FIG. 4).

On the other hand, the monitoring device 4A (area determining portion 11) determines based on the rotation angle positions of the servo motors M detected by the position sensors E whether or not the tool center point P of the robot 2 is located within the area 100A or 100B (Step S83 in FIG. 8). The area determining portion 11 generates the three-dimensional model of the robot 2 based on information, such as the rotation angle positions of the servo motors M and the preset lengths and shapes of the links. The area determining portion 11 determines whether or not the tool center point P of the three-dimensional model of the robot 2 is located within the area 100A or 100B. Then, the area determining portion 11 outputs the determination result to the speed monitoring portion 15.

Next, when the area determining portion 11 determines that the tool center point P of the robot 2 is located within the area 100A or 100B (YES in Step S83), the monitoring device 4 (speed monitoring portion 15) monitors whether or not the operating speed of the robot 2 is higher than the first speed. The first speed is 250 mm/s.

In the present embodiment, the speed monitoring portion 15 determines whether or not an operating speed V input from the speed calculating portion 14 is higher than a preset first speed $V_{th1}$. When the operating speed V is higher than the first speed $V_{th1}$, the speed monitoring portion 15 determines that the robot 2 has operated at abnormal speed. Then, the speed monitoring portion 15 generates an abnormal speed detection signal and outputs the abnormal speed detection signal to the stop signal generating portion 13. When the monitoring device 4 does not detect the abnormal speed, the monitoring device 4 returns to Step S81 and stands by for the reception of the monitoring signal.

Next, when the area determining portion 11 determines that the tool center point P of the robot 2 is not located within the area 100A or 100B (NO in Step S83), the monitoring device 4 (speed monitoring portion 15) monitors whether or not the operating speed of the robot 2 is higher than the second speed. The second speed is 800 mm/s. In the present embodiment, the speed monitoring portion 15 determines whether or not the operating speed V input from the speed calculating portion 14 is higher than a preset second speed $V_{th2}$. When the operating speed V is higher than the second speed $V_{th2}$, the speed monitoring portion 15 determines that the robot 2 has operated at the abnormal speed. Then, the speed monitoring portion 15 generates the abnormal speed detection signal and outputs the abnormal speed detection signal to the stop signal generating portion 13. When the monitoring device 4 does not detect the abnormal speed, the monitoring device 4 returns to Step S81 and stands by for the reception of the monitoring signal.

According to the present embodiment, in the outside-area region as the high speed operating region where the possibility that the robot collides with a person is low, the robot 2 is operated at high speed. Thus, the ability of the robot 2 is maximally exerted. Further, whether or not the robot is operated at such a speed that a risk of injury is low even if the collision is detected can be monitored. On the other hand, in the area 100A or 100B as the low speed operating region where the possibility that the robot collides with a person is high, whether or not the robot is operated at such a speed that the robot is not pushed into a collided part of a person during the coasting operation performed from the collision detection until the stop can be monitored. To be specific, the convenience in the cooperative work performed by the robot 2 and the operator working around the robot 2 further improves by the speed monitoring in addition to the force monitoring.

Other Embodiments

The external force detecting portion in each of the above embodiments calculates the external force, acting on the robot 2, based on the current values flowing through the servo motors M and the driving torque necessary to drive the servo motors M. However, the above embodiments are not limited to this. For example, the external force acting on the robot 2 may be detected by providing a force sensor at a tip end of the robot 2.

The robot 2 in each of the above embodiments is a double-arm type horizontal articulated robot. However, the above embodiments are not limited to this. The robot 2 may be a single-arm robot or a vertical articulated robot. Further, each of the arms includes four joint shafts. However, the above embodiments are not limited to this as long as each of the arms includes one or more joint shafts.

In each of the above embodiments, the two areas 100A and 100B are preset in the operating range of the robot in the monitoring device of the robot system. However, three or more areas may be set as long as a plurality of areas are set.

In each of the above embodiments, the monitoring criterion of the speed is set to the same value (250 mm/s) between the areas 100A and 100B set as the low speed operating regions in the operating range of the robot 2. However, the above embodiments are not limited to this. The monitoring criterion of the speed may be different between the areas 100A and 100B. For example, in the low speed operating area where the possibility that the robot collides with a person is high, the robot is operated at such a speed that the robot is not pushed into a collided part of a person during the coasting operation performed from the collision detection until the stop. The monitoring criterion (for example, a threshold of the operating speed or a threshold of the external force) is set depending on a part which is assumed to have a collision risk. For example, weight and risk are different between a hand and a body as the part having the collision risk, so that a speed to be set is different between the hand and the body. With this, the safety of the operator working around the robot further improves.

In each of the above embodiments, the external force acting on the robot 2 is calculated based on the current value of the servo motor M without using the force sensor. Therefore, the collision can be detected at low cost with a high degree of accuracy. Thus, the convenience in the cooperative work performed by the robot and the operator working around the robot further improves.

In each of the above embodiments, the monitoring device (4 or 4A) is provided separately from the control device 3. However, the monitoring device (4 or 4A) may be included in the control device 3. For example, the functional blocks of the portions (10 to 13) of the monitoring device 4 may be executed in the arithmetic processing unit 6 of the control device 3.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the scope of the present invention.

INDUSTRIAL APPLICABILITY

The present invention is useful when monitoring a robot system which works while coexisting with a person.

REFERENCE SIGNS LIST

1 robot system
2 robot
3 control device
4 monitoring device
5 current sensor
6 arithmetic processing unit
7 servo amplifier
10 external force detecting portion
11 area determining portion
12 force monitoring portion
13 stop signal generating portion
30 current torque converting portion
31 disturbance torque calculating portion
32 external force calculating portion
33 adder-subtracter
34 collision-inside-area determining portion
35 impact force calculating portion
36 collision-outside-area determining portion
61 current value generating portion
62 area setting portion
63 driving torque estimating portion
J joint shaft
M servo motor
E encoder
L power supply line

The invention claimed is:

1. A monitoring device of a robot system, the robot system including: a robot including at least one joint shaft and a servo motor configured to drive the joint shaft; and a control device configured to preset a predetermined area in an operating range of the robot and control an operation of the robot, the monitoring device comprising:

an external force detecting portion configured to detect external force acting on the robot;

an area determining portion configured to determine whether or not a predetermined portion of the robot is located within the predetermined area;

a force monitoring portion configured to when the area determining portion determines that the predetermined portion of the robot is located within the predetermined area, detect collision of the robot based on a first monitoring criterion including at least monitoring of the external force acting on the robot, and when the area determining portion determines that the predetermined portion of the robot is not located within the predetermined area, detect the collision based on a second monitoring criterion not including the monitoring of the external force; and a stop signal generating portion configured to, when the force monitoring portion detects the collision, generate a stop signal of the robot and supply the stop signal to the control device.

2. The monitoring device according to claim 1, wherein when the area determining portion determines that the predetermined portion of the robot is not located within the predetermined area, the force monitoring portion detects the collision based on the second monitoring criterion including monitoring of impact force proportional to a differential value of the external force acting on the robot.

3. The monitoring device according to claim 1, further comprising:
   a position sensor configured to detect a rotation angle position of the servo motor;
   a speed calculating portion configured to calculate an operating speed of the robot based on the rotation angle position of the servo motor detected by the position sensor; and
   a speed monitoring portion configured to
   when the area determining portion determines that the predetermined portion of the robot is located within the predetermined area, monitor whether or not the operating speed of the robot is higher than a first speed and
   when the area determining portion determines that the predetermined portion of the robot is not located within the predetermined area, monitor whether or not the operating speed of the robot is higher than a second speed higher than the first speed, wherein
   when the area determining portion determines that the predetermined portion of the robot is located within the area, and the speed monitoring portion determines that the operating speed of the robot is higher than the first speed, or when the area determining portion determines that the predetermined portion of the robot is not located within the area, and the speed monitoring portion determines that the operating speed of the robot is higher than the second speed, the stop signal generating portion generates a stop signal of the robot and supplies the stop signal to the control device.

4. The monitoring device according to claim 1, wherein the predetermined area comprises a plurality of areas preset in the operating range of the robot.

5. The monitoring device according to claim 4, wherein at least one of the first monitoring criterion and the first speed is different among the plurality of areas.

6. The monitoring device according to claim 1, further comprising a current sensor configured to detect a current value flowing through the servo motor, wherein the external force detecting portion includes:
   a current torque converting portion configured to convert the current value, flowing through the servo motor and detected by the current sensor, to a torque value;
   a driving torque estimating portion configured to estimate driving torque necessary to drive the servo motor;
   a disturbance torque calculating portion configured to calculate as disturbance torque a difference between the torque value obtained by the current torque converting portion and an estimate value of the driving torque; and
   an external force calculating portion configured to calculate the external force, acting on the robot, by using the disturbance torque calculated by the disturbance torque calculating portion.

* * * * *